United States Patent [19]

Iwamoto et al.

[11] 3,932,800
[45] Jan. 13, 1976

[54] DIRECT CURRENT POWER CONTROL CIRCUIT

[75] Inventors: Hideo Iwamoto; Mamoru Miyamoto, both of Itami, Japan

[73] Assignee: Mitsubishi Denki Kabushiki Kaisha, Tokyo, Japan

[22] Filed: Jan. 10, 1975

[21] Appl. No.: 540,191

[30] Foreign Application Priority Data
Feb. 12, 1974 Japan .............................. 49-17328

[52] U.S. Cl. ................................. 321/43; 321/45 C
[51] Int. Cl.² ......................................... H02M 7/515
[58] Field of Search ........................... 321/43, 45 C

[56] References Cited
UNITED STATES PATENTS

| | | | |
|---|---|---|---|
| 3,207,974 | 9/1965 | McMurray | 321/45 C |
| 3,360,712 | 12/1967 | Morgan | 307/252 M |
| 3,609,511 | 9/1971 | Risberg | 321/45 C X |
| 3,619,753 | 11/1971 | Thompson | 321/45 C X |
| R27,193 | 10/1971 | Risberg | 321/45 C X |

Primary Examiner—William M. Shoop
Attorney, Agent, or Firm—C. M. Lorin

[57] ABSTRACT

A DC to DC power converter of the chopper-type includes a reverse conducting main thyristor device, or equivalent, and a saturable autotransformer in the power path of the main thyristor device, the autotransformer being in the saturated state when the main thyristor device is conducting, and a gated capacitor commutating circuit to desaturate the autotransformer for commutating the main thyristor device out of conduction.

6 Claims, 7 Drawing Figures

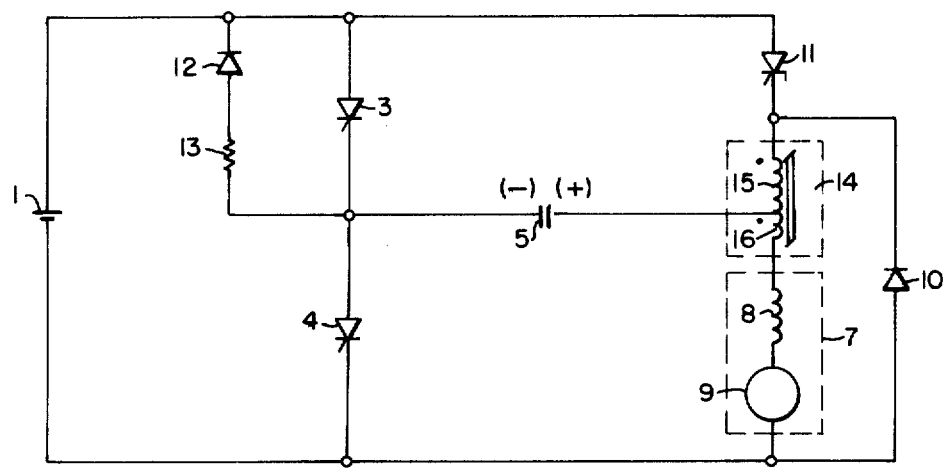
FIG. 3
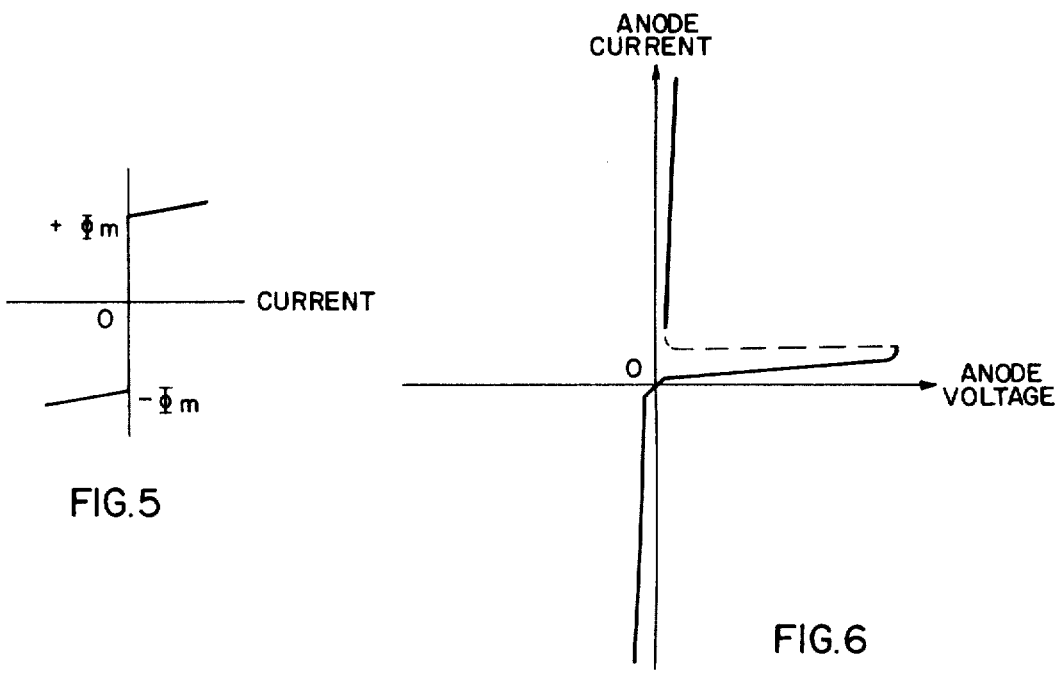
FIG. 5
FIG. 6
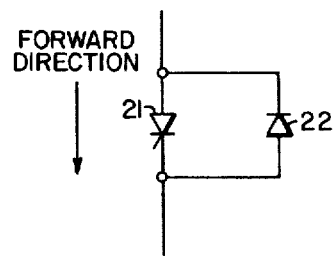
FIG. 7

3,932,800

DIRECT CURRENT POWER CONTROL CIRCUIT

BACKGROUND OF THE INVENTION

The invention relates in general to apparatus for supplying controlled direct current power to a load and more particularly to an improved circuit of the chopper-type using solid state controlled rectifiers. The use of SCR devices in DC to DC power converters is known: see for instance "Principles Of Inverter Circuits" B. D. Bedford and R. G. Hoft — John Wiley 1964, pages 340–357. Chopper circuits are used for the purpose of controlling the flow of power from a DC source to a load, which may be a DC motor. One important element of a chopper circuit is the commutating circuit. While SCR devices are used to switch a load current in the power path from the DC source to the load, control and regulation require controlled conduction of the main power switch. When gated the SCR device is turned on, however, a commutating circuit is necessary to turn off again the conducting SCR device. Generally, a commutating circuit comprises a commutating capacitor and a commutating thyristor. Some problems arise for an efficient use of the commutating capacitor. For instance, it is known to use an autotransformer in association with the commutating capacitor to insure that the capacitor is always charged up whenever load current starts to flow (see General Electric Silicon Controlled Rectifier Manual, 1964, page 169, FIG. 9.2.11 "The Jones Chopper").

Still the circuits of the prior art are not always satisfactory from the point of view of reliability, efficiency, or cost.

An object of the present invention is to provide a circuit for controlling DC power which is stable in operation, capable of increasing the upper limit for the frequency range of operation, of broadening the range of control of the DC power for a given size of the commutation capacitor and of reducing the size of the commutation capacitor for a given range of power control.

SUMMARY OF THE INVENTION

In accordance with the present invention apparatus is provided for supplying controlled direct current power to a load from a direct current power source, comprising reverse conducting controlled rectifier means for switching current from the source to the load in the forward direction, gated capacitor means for commutating the rectifier means out of conduction, with the provision of saturable transformer means having an unsaturated state between two saturated states, the power path including said rectifier means and said transformer means when the latter is in one of the saturated states; and in which said gated capacitor means is operative to apply a commutating voltage to said transformer means for changing the state thereof into said unsaturated state and for applying therethrough a reverse current to said rectifier means, thereby to terminate the conduction thereof.

BRIEF DESCRIPTION OF THE DRAWINGS

FIG. 3 illustrates the circuit according to the present invention;

FIG. 5 represents the magnetic flux characteristic of the saturable autotransformer shown in FIG. 3;

FIG. 6 shows a typical anode voltage to anode current characteristic of a reverse conducting thyristor device such as shown in FIG. 3;

FIG. 7 is a circuit combining a thyristor and an antiparallel diode which is equivalent to the reverse conducting thyristor device of FIG. 3.

This invention provides a circuit for controlling a DC power wide in a range of control of DC output powers, and stable in operation upon a variation of load while requiring only a small capacitor for commutating a main thyristor.

DESCRIPTION OF THE PRIOR ART

Figure 1:
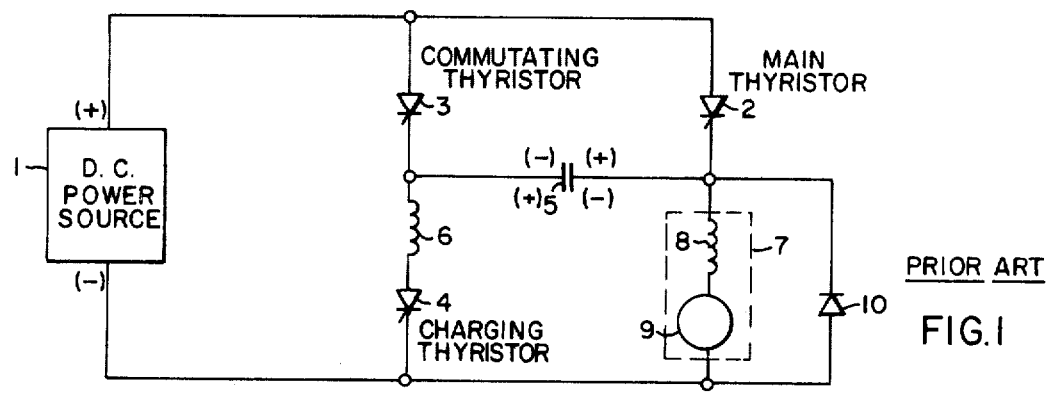
FIG. 1 shows a chopper circuit of the prior art used in conjunction with a load illustrated as a direct current motor with a field winding.

FIG. 1 is a diagram illustrating one example of a circuit for a conventional apparatus for controlling a DC power (which is called a chopper hereinafter). This circuit includes: a source of direct current 1, a main thyristor 2, a thyristor 3 for turning off the main thyristor 2 (hereinafter called a commutation thyristor), a thyristor 4 for charging a commutation capacitor 5 (called hereinafter a charging thyristor), a reactor 6, a load 7 (shown, by way of example, as being a direct current motor 9 having a field winding 8) and a rectifier diode 10.

Figure 2:
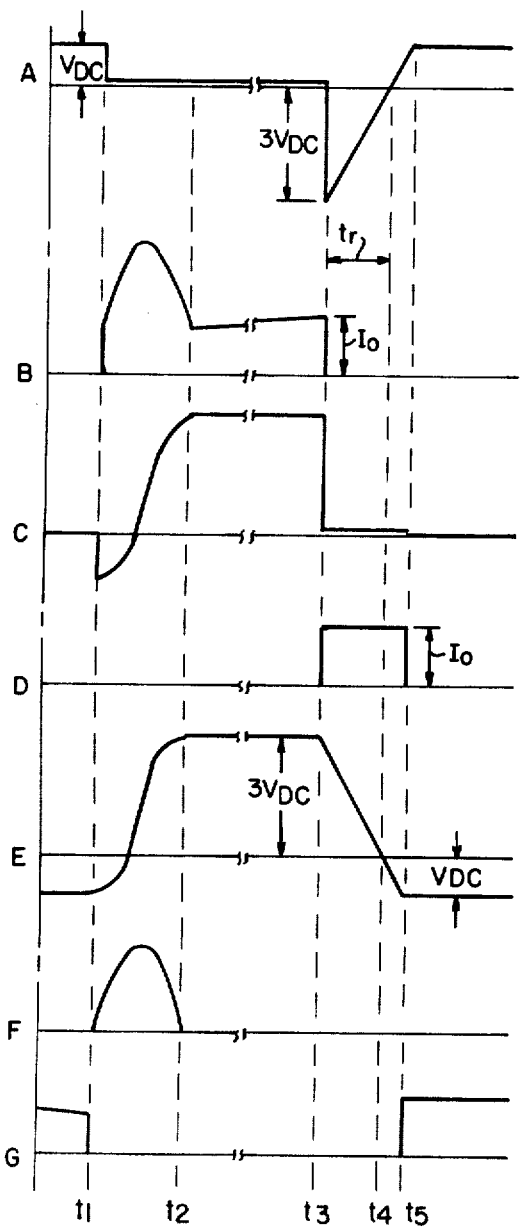
FIG. 2 shows curves A through G illustrating the operation of the circuit of FIG. 1.

FIG. 2 is a diagram explaining the operation and illustrating voltage and current waveforms for various portions in the circuit of FIG. 1 in the steady-state operation. Curves A and B show waveforms of voltage and current for the main thyristor 2. Curves C and D show waveforms of voltage and current for the commutation thyristor 3. Curve E shows a waveform illustrating the voltage across the commutation capacitor 5. Curve F is a current waveform for the charging thyristor 4, and curve G shows a current waveform for the rectifier diode 10.

In FIG. 1, it is now assumed that the capacitor 5 is charged to a voltage $V_{DC}$ across the DC source 1 with the polarity reversed from that illustrated. If the gates of the thyristors 2 and 4 are triggered at a point in time $t_1$ (FIG. 2), then those thyristors are turned on to supply power from source 1 to load 7. Simultaneously, a resonance current, such as in curve F, flows through a closed circuit comprising the DC source 1, thyristor 2, capacitor 5, reactor 6, and thyristor 4, and returned to the DC source 1 due to the resonance of the capacitor 5 and the reactor 6. When this flow of resonance current terminates after one half cycle (at a point in time $t_2$), the voltage across the capacitor 5 is charged to a voltage equal to three times the voltage across the DC source ($3V_{DC}$) with the polarity as illustrated (see curve E), while a reverse voltage is applied to the thyristor 4 to turn thyristor 4 off.

Then, when the gate of the commutation thyristor 3 is triggered at a predetermined point in time $t_3$, thyristor 3 is turned on causing a current, shown by curve D, to flow through a closed circuit back to the DC source 1 comprising the DC source 1, the thyristor 3, the capacitor 5 and the load 7. In this case, load 7 is a series winding motor and therefore it is assumed that the thyristor 3 has flowing therethrough a current having a peak magnitude identical to that immediately before the firing of the thyristor due to the action of the inductive component of that motor. As a result, a voltage across capacitor 5 is rectilinearly changed as shown by curve E. When the voltage across capacitor 5 is charged to $V_{DC}$ with a polarity reversed from that illustrated at a point in time $t_5$, charging terminates. At that moment, the main thyristor 2 is applied with a reverse voltage as shown by curve A. If the time interval ($t_r=t_4-t_3$) during which this reverse voltage is applied is longer than the turn-off time of the main thyristor, then the main thyristor is turned off. Thereafter, the load current flows through the diode 10 at and after the time $t_5$ due to the action of the inductance of the load 7.

The foregoing describes the operation for one cycle in the normal operation.

Upon starting, an initial voltage charged on capacitor 5 is null and therefore the thyristors 2 and 4 are triggered. After the capacitor has been charged with the resonance current, a voltage thereacross is approximately of $2V_{DC}$. However, it is charged up to $3V_{DC}$ in the second cycle, as previously explained.

Conventional circuits such as above described are disadvantageous in the following respects:

i. Since, during the commutation the current charging the capacitor 5 (a current flowing through the main thyristor 3) is substantially equal to the load current at time $t_3$, the charging time is much changed by any variation in the load. More specifically, the reverse bias time ($t_r=t_4-t_3$) of the main thyristor may be so affected by a variation in the load that the reverse bias time becomes short under heavy loading. Thus there is a danger that the main thyristor fails to be commutated (or fails to be turned off). On the other hand, because the load current is small under light loading, the capacitor has a long charging time ($t_3-t_5$). If the charging time is too long and if the commutation thyristor 3 is in its conducting state or in such state that it does not recover the blocking power in the next cycle and even immediately before the thyristors 2 and 4 are turned on, then a short-circuiting circuit is formed consisting of the DC source 1 the thyristor 3, the reactor 6 and the thyristor 4 and it is disabled to perform the further operation.

ii. As the operating frequency of the circuit and the operating duty of the main thyristor are affected by both the turn-off time of each thyristor and the load current, as above described, the maximum operative frequency is low.

Also for similar reasons, the operating duty of the main thyristor is narrow in its variable range, which causes a narrow range within which an electric power supplied to the load can be controlled. Therefore, if a DC motor, for example, is the load, it has the disadvantage that the range within which the speed can be varied is narrow.

iii. For the commutation capacitor 5 a relatively high magnitude is required.

In contrast, the present invention provides a circuit for controlling a DC power, stable in operation and capable of increasing the upper limit of the operating frequency while being capable of broadening the range of control of DC power and still requiring the magnitude of the commutation capacitor to be relatively small.

DESCRIPTION OF THE PREFERRED EMBODIMENT

FIG. 3 is a circuit diagram illustrating one embodiment of the present invention. Reference numerals identical to those in FIG. 1 designate components identical or corresponding to those shown in FIG. 1. The circuit comprises a main thyristor 11 consisting in a reverse conducting triode thyristor, a rectifier diode 12, a resistance 13, and a saturable current transformer 14 having an intermediate tap, defining a primary winding 15 and a secondary winding 16.

A reverse conducting triode thyristor (reverse conducting 3-terminal thyristor) such as the main thyristor 11 of FIG. 3 is a thyristor having the switching function in the forward direction like a reverse blocking triode thyristor (reverse blocking 3-terminal thyristor) as shown in FIG. 6 but not having the blocking power in the reverse direction so that a reverse current comparable to the forward current can flow through the thyristor. An equivalent circuit is shown in FIG. 7.

Figure 4:
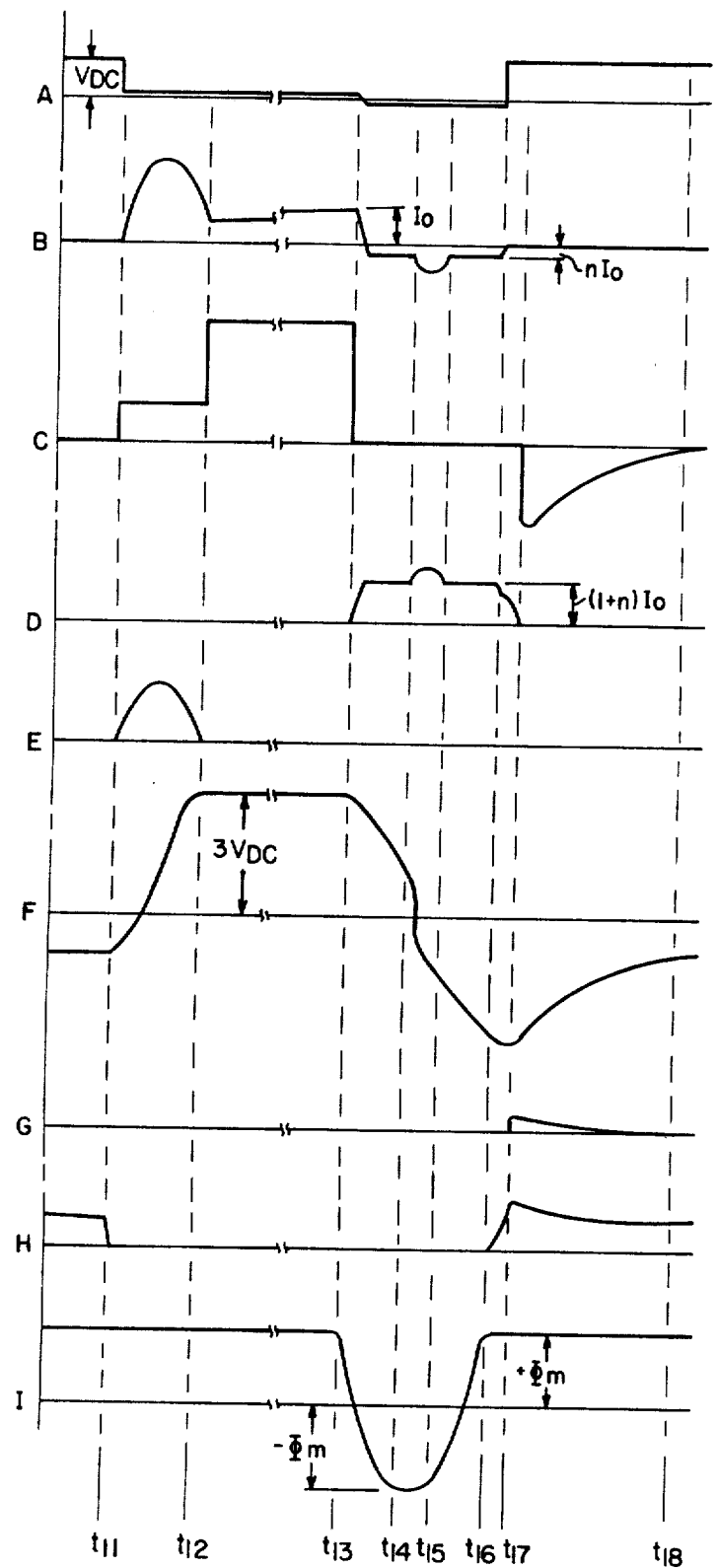
FIG. 4 shows curves A through I illustrating the operation of the circuit of FIG. 3.

FIG. 4 includes curves explaining the operation and illustrating voltage and current waveforms for various portions of the circuit of FIG. 3 in normal operation. Curves A and B indicate an anode voltage and a current waveform for the main thyristor 11. Curves C and D indicate an anode voltage and an anode current waveform for the commutation thyristor 3. Curve E indicates an anode current waveform for the voltage charging thyristor. Curve F is a voltage waveform for the commutation capacitor 5. Curve G is a current waveform for diode 12. Curve H is a current waveform for diode 10 and curve I indicates the waveform of the magnetic flux in the saturable current transformer 14.

In FIG. 3 it is assumed that capacitor 5 has been initially charged to substantially a source voltage of $V_{DC}$ with the polarity reversed from the one illustrated, and also that the saturable current transformer 14 is in its saturated state, while a current is flowing through a closed circuit including load 7, diode 10 and saturable current transformer 14.

Further, the saturable current transformer 14 has generally hysteresis but it is here assumed that it has no hysteresis in order to facilitate the analysis. Also it is assumed that at the inductance no saturation is infinitely high and the inductance at saturation is constant with a linearity by approximation such as shown in FIG. 5. It is assumed that the current transformer has primary and secondary windings wound with the polarity illustrated and under close coupling.

First, the gates of the main thyristor 11 and the charging thyristor 4 are triggered at a time $t_{11}$. This causes the turning on of those thyristors. At that time, since the saturable current transformer 14 is in its saturated state, electric power from the DC source 1 is supplied to the load 7 through the main thyristor 11 and the saturable current transformer 14. Also a resonance current from the source 1, due to capacitor 5 and the saturation inductance of the saturable current transformer, flows through a closed circuit including the main thyristor 11, the primary winding 15 of the saturable current transformer 14, the capacitor 5 and the charging thyristor 4, (see curve E, FIG. 4), and capacitor 5 becomes charged up to substantially $3V_{DC}$ with the polarity illustrated. Upon the charging of the capacitor 5 being terminated, the flow of the resonance current terminates (at a time $t_{12}$), and the charging thyristor 4 receives a reverse voltage to be turned off.

Then, after the lapse of a predetermined time interval, the gate of the commutation thyristor 3 is triggered at a time $t_{13}$ (FIG. 4), whereupon the commutation thyristor 3 is turned on to initiate the charge of the capacitor 5 to discharge through the primary winding 15 of the saturable current transformer 14, the main thyristor 11, and the commutation thyristor 3. There-upon, the saturable current transformer 14 is returned from its saturated region back to the unsaturated region to limit the capacitor current by current transformer action. More specifically, assuming that a turn ratio between the primary winding 15 and the secondary winding 16 is of 1:$n$ ($n<1$), the current $ic$ flowing through the capacitor 5 is the sum of the load current Io and a reverse current $i_R$ ($= n$Io) through the main thyristor.

Therefore, $$ic = Io + i_R = (1 + n)Io$$

is obtained. Accordingly, the voltage across the capacitor is rectilinearly decreased to swing a magnetic flux in the current transformer in the negative direction.

Then, when the magnetic flux in the saturable current transformer 14 reaches its saturatd magnetic flux $\Phi m$ at a time $t_{14}$ as shown by curve I, the current transformer is saturated leading to a flow of resonance current due to both the saturation inductance thereof and the capacitance of the capacitor 5 ($t_{14}$–$t_{15}$).

If the resonance current decreases to (1 + $n$)Io at a time $t_{15}$, then a negative current is applied to the current transformer 14 to again swing the transformer into its unsaturated region. Therefore, the magnetic flux goes from –$\Phi m$ to +$\Phi m$. At that time, the current through capacitor 5 is reduced to (1 + $n$)Io.

Upon the magnetic flux in the saturable current transformer 14 reaching the saturated magnetic flux, the current transformer is saturated thus deprived of current transformer action. Thus, the reverse current through the main thyristor 11 becomes null at a time $t_{16}$ to terminate the bias time interval of the main thyristor. Between time points $t_{16}$ and $t_{17}$ the capacitor is overchanged due to both the impedance of the source and the impedance of the wiring, not shown in FIG. 4.

At time $t_{17}$, the capacitor is charged to substantially 3V$_{DC}$ with a polarity reversed from that illustrated. This charge is discharged through resistance 13, diode 12, DC source 1, diode 10 and the primary winding 15 of the current transformer 14. By selecting a magnitude R of the resistance 13 so that R ≥ 2 $\sqrt{L/C}$ holds (where L is the inductance of the current transformer 14, and C is the capacitance of the capacitor 5), the discharge current does not oscillate. At a time $t_{18}$ the voltage across capacitor 5 equals the voltage V$_{DC}$ across the DC source thereby to stop the discharge.

Where the load 7 is inductive, a current flows through a closed circuit including load 7, diode 10 and the current transformer 14 at and after time $t_{16}$.

The foregoing describes the operation during one cycle in the normal operation.

As described for the conventional system, initial voltage across the capacitor is null at the start. Therefore, when the main thyristor 11 and the charging thyristor 4 are first triggered, the capacitor is charged up to twice the source voltage (2V$_{DC}$) with the polarity illustrated. Thereafter the triggering of the commutation thyristor 3 causes the capacitor 5 to charge to about 2V$_{DC}$ with the polarity reversed from that illustrated, in an operation similar to the one hereabove described, after which it is discharged to V$_{DC}$. Thus, the capacitor is charged to about 3V$_{DC}$, with the polarity illustrated, in the second cycle.

The foregoing description of the commutation of the main thyristor 11 has been made in the case when the magnetic flux in the saturable current transformer 14 reaches the saturated magnitude –$\Phi m$ at time $t_{14}$ when the voltage across the capacitor is still positive. However, for high magnitudes of the load current Io, the magnetic flux in the current transformer reaches –$\Phi m$ at such time that the voltage across the capacitor 5 has just become null. In such event, both the saturation inductance of the current transformer and the resonance current portion through the capacitor during $t_{14}$ and $t_{15}$ disappear thereby to give the current through the capacitor, that is the current through the commutation thyristor 4 (curve D) a trapezoidal waveform. For a further increase in the load current Io, the magnetic flux in the current transformer does not reach –$\Phi m$. In such case the current through capacitor 5 (the current through the commutation thyristor 4) has a conduction time $t_{13}$–$t_{16}$ which decreases with an increase in the load current. Accordingly, the capacitance of the capacitor and the dimension and the number of turns of the saturable current transformer may be selected so that for a maximum load current, the magnetic flux in the current transformer reaches the saturated magnetic flux of –$\Phi m$ when the voltage across the capacitor is null.

The current characteristics in the circuit according to the present invention offers the following excellent features:

If during the conduction of the load current Io, the magnetic flux in the saturable current transformer 14 has reached –$\Phi m$ when the voltage across the capacitor 5 is null upon commutation, at that time, the saturation inductance of the current transformer and the capacitor cause no resonance and the capacitor current approximates a trapezoidal wave. Therefore, the main thyristor has a reverse bias time ($t_r=t_{16}-t_{13}$) given by the following equation:

$$(1 + n)Io \cdot t_r = 2 \cdot (3V_{DC}) \cdot C$$

Therefore $$t_r = \frac{6 \cdot V_{DC} \cdot C}{(1+n) Io}$$

assuming now that $n = 0.2$ it follows that $$t_r = 5 \frac{V_{DC} \cdot C}{Io} \qquad (1)$$

In contrast, the prior art circuit of FIG. 1 has the capacitor charging with the constant load current Io during the commutation of the main thyristor. Therefore, the reverse bias time ($t_r=t_4-t_3$) of the main thyristor is given by the following equation:

$$Io \cdot t_r = C \cdot 3V_{DC}$$

Therefore:

$$t_r = 3 \frac{V_{DC} \cdot C}{Io} \qquad (2)$$

Comparing equation (1) with equation (2) the circuit of the present invention has a reverse bias time, which is applied to the main thyristor, increased by 5/3 times as compared with the prior art circuit for a capacitor of the same magnitude. As a result, it is possible to use a thyristor having a correspondingly long turn-off time. On the other hand, if a thyristor having the same turn-off time is used, then it is seen that the capacitance of the capacitor of the present invention may be reduced to 3/5 of the capacitance of the capacitor in the prior art.

Also by setting the reverse bias time $t_r$ of the main thyristor 11 to be equal to, or greater than, the turn-on time thereof for both a maximum load and a minimum load, it is possible to maintain a stable operation of the circuit of the present invention independently of a variation in load. Also by ensuring that the reverse bias time is equal to or greater than the turn-off time as above described with a maximum source voltage, the operation can be performed independently of a change in the source voltage.

In contrast, prior art circuits are subject to limitations as to the load requirements because the capacitor increases in both discharging and charging times ($t_3$–$t_5$ in FIG. 2) under light loading to increase the conduction time of the commutation thyristor 3. Also a decrease in the source voltage causes the main thyristor to decrease in the reverse bias time.

It appears that the circuit according to the present invention can perform with stable operation despite variations in both source voltage and load.

It also appears that the circuit according to the present invention is not affected by either load and source voltage and therefore, the range within which the operating duty is variable can be broadened while the operating frequency can still be increased toward the upper limit. If a DC motor is used as the load (as the case is with the above-mentioned embodiment), then broadening of the range within which control is possible means that a broad range of speed control is possible. That the operating frequency is high means that a direct current of relatively slow ripple can be supplied to the motor.

Furthermore, the voltage across the commutation capacitor is returned to the source voltage $V_{DC}$ with a polarity reversed from that illustrated in FIG. 3 at the end of each cycle. Thus the capacitor is charged up to substantially $3V_{DC}$ with the polarity illustrated for the next cycle.

Accordingly, the voltage across the capacitor is rarely raised to a voltage in excess of three times the source voltage.

As can be realized from the above description, the circuit according to the present invention can be used for controlling DC power under a stable operation and capable of raising the upper limit of the operating frequency with a simple circuit configuration while, broadening the range of DC power control is provided and while keeping the magnitude of the commutation capacitor relatively low.

The description has been made in the case of a reverse conducting triode thyristor device being used as the main switch. It is possible to replace such reverse conducting thyristor device by a combination of a reverse blocking triode thyristor 21 and a rectifier diode 22 in antiparallel configuration as shown in FIG. 7.

We claim:

1. In apparatus operative with a direct current power source for supplying current through a predetermined power path to a load, the combination of:
   reverse conducting controlled rectifier means for switching said load current from said source to said load in the forward direction;
   a commutating thyristor and a capacitor in series connection thereto for commutating said rectifier means out of conduction;
   a charging thyristor and a resistor in series connection thereto for initially charging said commutating capacitor from said source with a predetermined initial potential;
   a saturable autotransformer having an unsaturated stated between two saturated states, said autotransformer including a first winding connected to said rectifier means, a second winding connected to said load, and a tap terminal common to said first and second windings and connected to said commutating capacitor with said first winding having more turns than said second winding;
   said power path including said rectifier means and said first and second winding of said autotransformer in one of said saturated states; and
   said commutating thyristor and capacitor being connected in parallel to said first winding and said rectifier means and being operative to apply a commutating voltage to said auto-transformer for changing the state thereof into said unsaturated state and for applying therethrough a reverse current to said rectifier means for terminating the conduction of said rectifier means.

2. The apparatus of claim 1 with means for gating said rectifier means for conduction for resonantly charging said capacitor from said initial potential to a commutation potential and for initiating an operation period for said load, said autotransformer being in a saturated state.

3. The apparatus of claim 2 with means for gating said commutating thyristor at an instant selected for the termination of said operation period, said commutating potential being applied to said first winding to desaturate said autotransformer up to the other said saturated state, and said commutating capacitor being further operative through said first winding to return said autotransformer to said one saturated state.

4. The apparatus of claim 3 with said capacitor means being discharged back to said initial potential following the return of said rectifier means to non-conduction.

5. The apparatus of claim 3 with the provision of diode means connected in parallel to said autotransformer and said load for allowing circulation of inductive energy following the return of said rectifier means to nonconduction.

6. An apparatus for supplying controlled direct current power to a load, said apparatus comprising a first serial network including main reverse conducting thyristor means and saturable transformer means having an intermediate tap, said first serial network being in series with said load; a second serial network including charging thyristor means and commutating thyristor means serially connected in the forward direction, and connected in parallel to said first serial network; a third serial network including a commutating capacitor connected between said intermediate tap and the junction point between said charging and commutating thyristors, charging diode means and charging resistor means serially connected across said commutating thyristor means; and second diode means connected at one end to the junction point between said main thyristor means and said saturable transformer means and at the other end to the junction point between said charging thyristor means and said load.

* * * * *